United States Patent [19]

Tsuda et al.

[11] Patent Number: 5,213,641
[45] Date of Patent: May 25, 1993

[54] PAIR OF RADIAL TIRES WITH DIRECTIONAL AND SYMMETRICAL TREAD PATTERNS

[75] Inventors: Toru Tsuda; Toshio Hayakawa, both of Higashimurayama, Japan

[73] Assignee: Bridgestone Corporation, Tokyo, Japan

[21] Appl. No.: 497,035

[22] Filed: Mar. 20, 1990

[30] Foreign Application Priority Data

Mar. 27, 1989 [JP] Japan .................................... 1-71984

[51] Int. Cl.$^5$ ............................................ B60C 11/11
[52] U.S. Cl. .............................. 152/209 A; 152/209 R
[58] Field of Search ............ 152/209 R, 209 A, 209 B

[56] References Cited

U.S. PATENT DOCUMENTS

| | | |
|---|---|---|
| 4,732,194 | 7/1988 | Saneto et al. . |
| 4,785,863 | 11/1988 | Tsuda et al. . |
| 4,848,429 | 7/1989 | Mezzanotte ..................... 152/209 A |
| 4,936,364 | 6/1990 | Kajiwara et al. ................ 152/209 R |
| 4,986,324 | 1/1991 | Suzuki et al. .................... 152/209 R |

FOREIGN PATENT DOCUMENTS

| | | |
|---|---|---|
| 0299766 | 1/1989 | European Pat. Off. ......... 152/209 D |
| 3815829 | 12/1988 | Fed. Rep. of Germany . |
| 0275202 | 11/1989 | Japan .............................. 152/209 D |
| 0006204 | 1/1990 | Japan .............................. 152/209 A |

OTHER PUBLICATIONS

Patents Abstracts of Japan, May 9, 1989, vol. 13, No. 193.

*Primary Examiner*—Michael W. Ball
*Assistant Examiner*—Nancy T. Krawczyk
*Attorney, Agent, or Firm*—Sughrue, Mion, Zinn, Macpeak & Seas

[57] ABSTRACT

A pair of radial tires consist of two tires each having a tread comprising annular land portions formed by a plurality of circumferential main grooves extending in the circumferential direction of the tire, and rows of blocks formed by extending transverse main grooves inclinedly in the circumferential direction in at least land portions located at axially opposite side edge portions of the tire. Tread patterns of these two tires are asymmetrical and have directional property. Transverse main grooves of each of the tires, which define the rows of the blocks to be located axially inside, are extended inclinedly downwardly toward the inner side of the tread in the width direction as viewed from the front side of the tire. Each of the transverse main grooves of the tire, which define the row of the blocks located axially on the outer side is extended in an almost inverse V-letter shape as viewed from the front side of the tire.

3 Claims, 6 Drawing Sheets

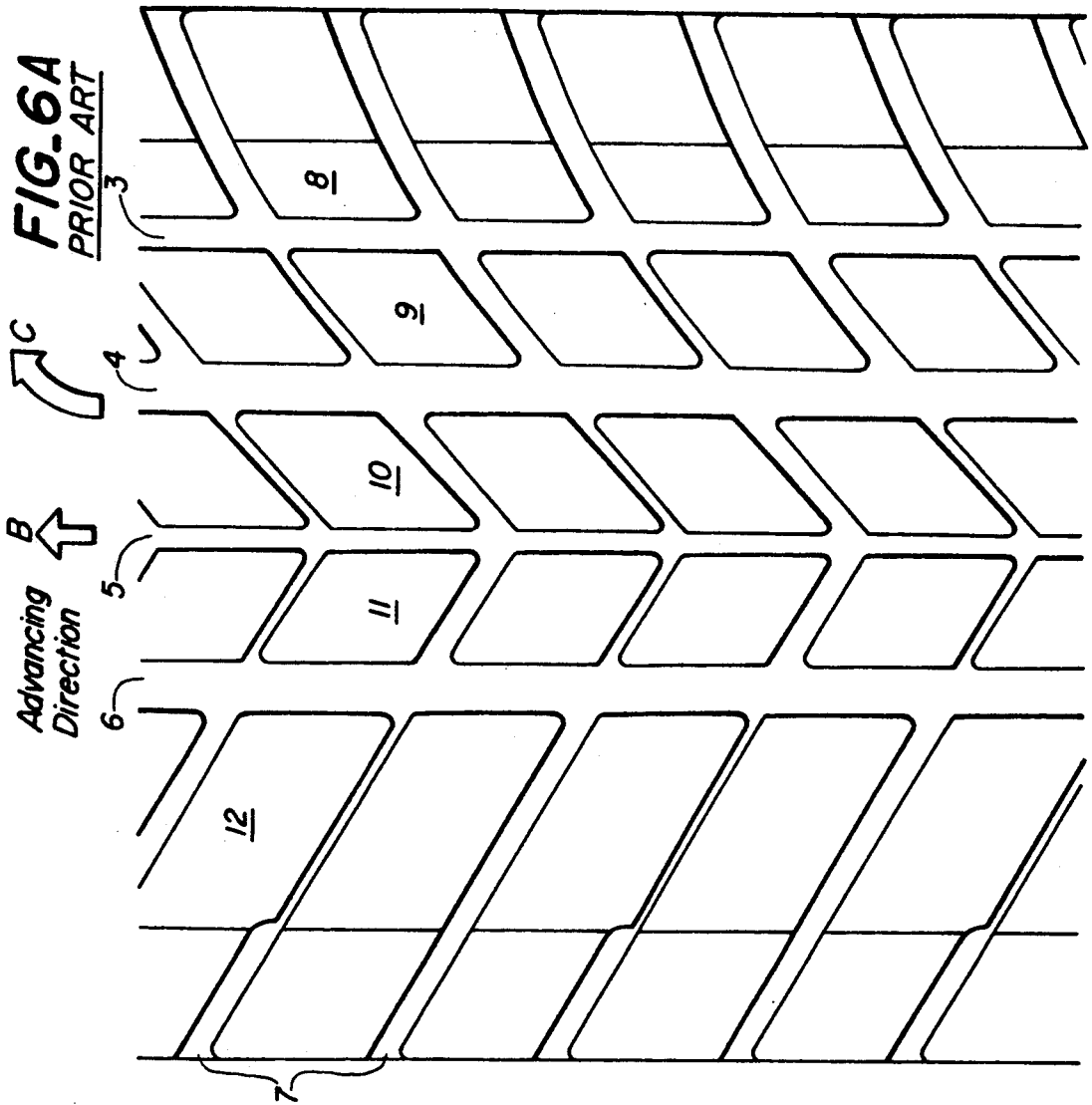

PAIR OF RADIAL TIRES WITH DIRECTIONAL AND SYMMETRICAL TREAD PATTERNS

BACKGROUND OF THE INVENTION (1) Field of the Invention

The present invention relates to a steered pair of radial tires for use in high speed vehicles. For example, such a steered pair of radial tires produce great cornering forces particularly at large cornering angles, when they are applied to low aspect ratio pneumatic radial tires.

(2) Related Art Statement

A tread pattern shown in FIG. 4 is available by way of example for known high speed vehicle radial tires having an asymmetrical pattern and a directional property.

FIG. 4 shows the tread pattern as viewed from the front side of a tire which is fitted to a left front wheel of a vehicle as a steering wheel. A right front wheel tire has a tread pattern having an axially symmetrical relationship to that in FIG. 4.

In FIG. 4, an arrow A shows a rotational direction of the tire, and reference numerals 1 and 2 show a tread and a treading surface, respectively.

In the illustrated tread pattern, annular land portions are formed by providing four circumferential main grooves 3 through 6 extending linearly in the circumferential direction of the tire in the treading surface 2 of the tread. As viewed in the front view of the tire, a plurality of bent main grooves 7 extend over the entire width of the tread in the almost L-letter shaped form, while the main grooves 7 are bent at the circumferential main groove 5. Thereby, plural rows 8 through 12 of blocks are formed in the land portions, respectively. By employing such a tread pattern, the wear resistance of the tire is improved, and noise of the pattern is reduced.

Considering gripping performance on dry roads in above conventional tire, sufficiently great cornering forces can be produced in a range of small cornering angles, in other words, at small slip angles, as shown in FIG. 5 by a solid line. However, the cornering forces unfavorably rapidly drop in a range of great slip angles. As clearly shown in a foot print of FIG. 6, water drain grooves having an almost V-letter shape are backwardly formed in an advancing or forwardly rotational direction B of the tire. Consequently, there is a possibility that the bent transverse main grooves 7 themselves cannot completely drain all water entering the transverse main grooves 7 from the front side in the advancing or forwardly rotating direction of the tire irrespective of the magnitude of the cornering angles. Therefore, such a tire has a problem in that a hydroplaning phenomenon is likely to occur.

SUMMARY OF THE INVENTION

The present invention has been accomplished through investigations of causes for the drop in the gripping performance on dry roads at large cornering angles and through efforts for improving the water drainability at the great cornering angles. Particularly, the present invention is to provide a pair of radial tires which can produce sufficiently great gripping forces both on dry roads and on wet roads at large cornering angles.

A pair of the radial tires according to the present invention consist of two steered tires each having a tread comprising annular land portions formed by a plurality of circumferential main grooves extending in the circumferential direction of the tire, and rows of blocks formed by extending transverse main grooves inclined in the circumferential direction in at least land portions located at axially opposite side edge portions of the tire, tread patterns of these two steered tires being asymmetrical and having directional property. Each of the transverse main grooves of each of the steered tires defines the rows of the blocks to be located on an axially inside portion of a respective tire is extended inclinedly downwardly toward the inner side of the tread in the width direction as viewed from the advancing side of the tire. Each of the transverse main grooves of the tire to form the rows of the blocks located axially on the outer side is extended in an almost inverse V-letter shape as viewed from the advancing side of the tire.

During cornering of the vehicle, great forces act upon the steering wheel located outside as viewed in the cornering direction. Particularly, ground contacting pressure at the outer portion of the outer steering wheel becomes high, and side forces are produced mainly there to turn the vehicle. This will be explained with reference to the foot print shown in FIG. 6. When the tire is steered to a direction shown by an arrow C, great forces act upon the blocks 12a in the outer block row 12 (see FIG. 4).

In this case, a side force Fx, a rolling resistance Fy and an entire tire frictional force Y are shown by vectors in the steered tire. The entire tire frictional force Y is a resultant force of the side force Fx and the rolling resistance Fy. Assume that such an entire tire frictional force occurs in the block 12a of the block row 12. In the case of the conventional tire, since rigidity of the block 12a can sufficiently be increased in relation to the acting direction of the entire tire frictional force, very high entire tire frictional forces Y and in its turn side forces Fx can be produced at not greater than cornering angles at which the block 12a transversely slips on road. Therefore, in the range of such cornering angles, high cornering forces can be produced as shown in FIG. 5 by the solid line.

However, in this conventional tire, when the cornering force increases and centrifugal forces and other external forces acting upon the block 12a exceed the maximum value of the entire tire frictional force Y, the tire uniformly transversely slip on the road as a whole. Consequently, the cornering forces rapidly drop as shown in FIG. 5.

Therefore, according to the present invention, the blocks corresponding to the blocks 12a of the outer block row 12 in the conventional tire are defined by the transverse main grooves extending in the almost V-letter shape. Consequently, the rigidity of the blocks in the acting direction of the entire tire frictional forces Y does not become so great unlike the conventional block 12a. Accordingly, cornering forces in the small cornering angle range are not so great as those in the conventional tire as shown in FIG. 5 by a broken line. Since the block produces the entire tire frictional forces Y while it is elastically deformed greatly by a decreased amount in the rigidity from that in the conventional tire, the cornering forces can be increased even in the range of large cornering angles. In addition, assume that the blocks transversely slip when the entire tire frictional force Y exceeds its limit. Since the blocks have bent edge portions directed in a direction crossing a slipping direction because of definition of the blocks with the V-letter shaped transverse main grooves, slip resisting forces are produced at side edge portions of the blocks. Consequently, drops of the cornering forces in the range of large cornering angles can extremely be mitigated as shown in FIG. 5 by the broken line.

Therefore, according to the steered tire pair of the present invention, the gripping performance on dry roads at large cornering angles can greatly be improved as compared with the prior art.

Further, in the transverse main grooves bent in the V-letter shape, those portions which are located on the outer side of the tread in the width direction can function to smoothly drain water entering the transverse main grooves from the front side of the tire in the advancing direction to the edges of the tread. Moreover, since the bent portions drain invading water at large cornering angles as if they were straight grooves, gripping performance on wet roads at large cornering angles can also be greatly improved as compared with the prior art.

In the above construction, a distance from the circumferential main groove defining the outermost land portion to the bent point of the V-letter shaped transverse groove is preferably 20-110%, more preferably 30-95% of a distance from the circumferential main groove to the side edge of the treading surface of the tread.

That is, if the distance is less than 20%, the rigidity of the blocks against forces inputted from the road becomes so low that great entire tire frictional forces Y and side forces Fx cannot be produced. Consequently, necessary cornering forces cannot be produced irrespective of the magnitude of the cornering angles. In addition, although the ground contact area may exceed the treading portion of the tread during cornering, that portion of the tread which exceeds 110% will not contact the ground.

In the case of the steered tire pair, the row of the block on the axially inner side of each of the tires has a tendency to float during cornering of the tire. Thus, they cannot effectively contribute to increase in the gripping forces at large cornering angles. In the present invention, in order to improve wear resistance and reduce noise of the pattern, the transverse main grooves forming such a row of the blocks are downwardly inclined in the widthwise inner direction of the tread as viewed from the advancing side of the tire.

These and other objects, features, and advantages of the invention will be appreciated upon reading of the following description of the invention when taken in conjunction with the attached drawings, with the understanding that some modifications, variations and changes of the same could be made by the skilled person in the art to which the invention pertains without departing from the spirit of the invention or the scope of claims appended hereto.

BRIEF DESCRIPTION OF THE DRAWINGS

For a better understanding of the invention, reference is made to the attached drawings, wherein:

FIG. 6 is a view of the foot print of the conventional tire.

DETAILED DESCRIPTION OF THE INVENTION

Embodiments of the present invention will be explained below with reference to the attached drawings.

Figure 1:
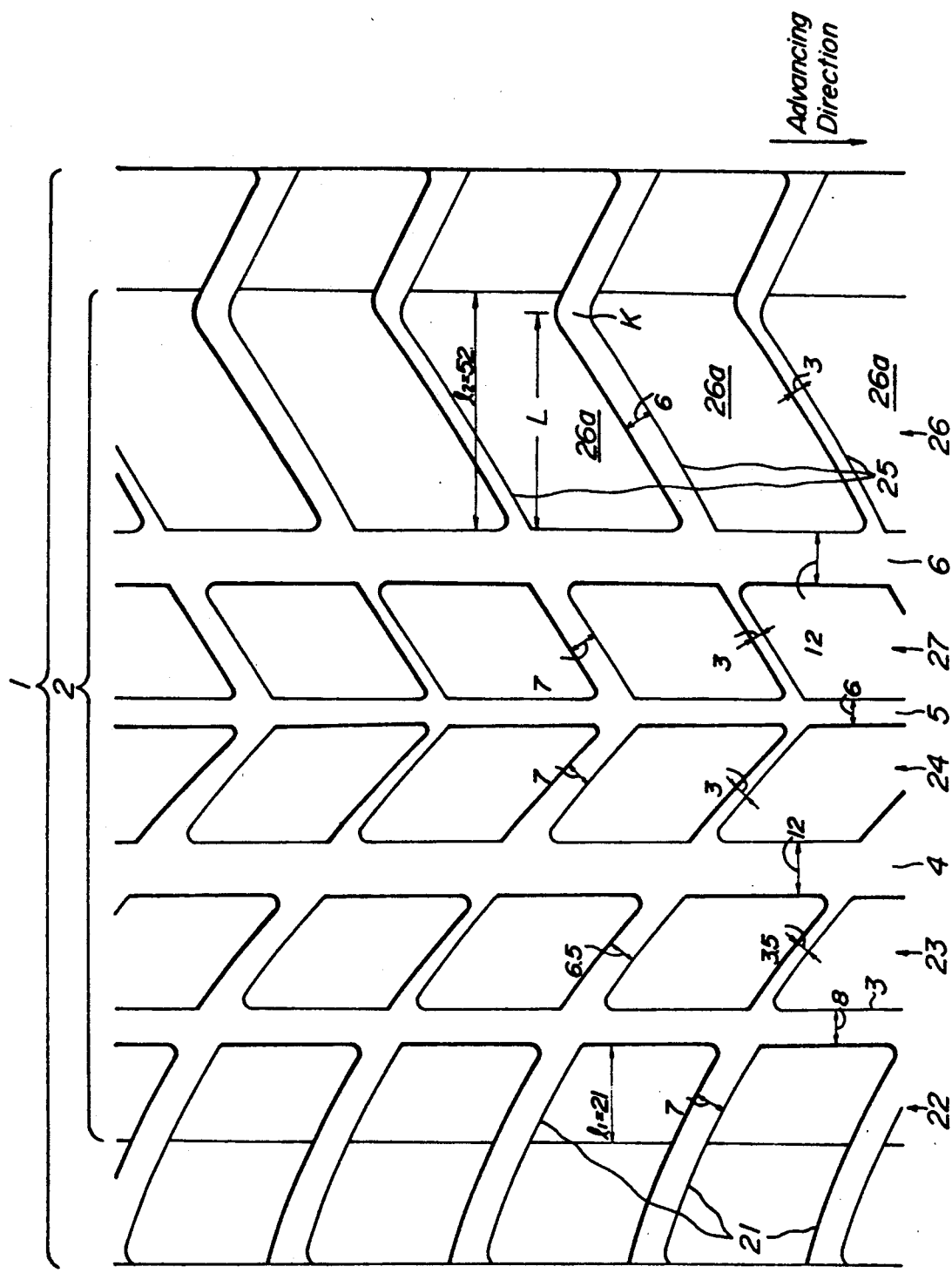
FIGS. 1 through 3 are embodiments of the tread pattern according to the present invention.

FIG. 1 is a front view of the tread pattern of a tire to be applied to a left front side wheel. The other tire forming a steered pair with the former tire has a tread pattern axially symmetrical to that of the tire in FIG. 1.

Since the internal construction of the tire is the same as that of conventional radial tires, illustration thereof is omitted.

In FIG. 1, reference numerals 1 and 2 show a tread having the width of 240 mm and a treading surface of the tread having the width of 186 mm, respectively. Reference numerals 3, 4, 5 and 6 show circumferential main grooves extended linearly in the circumferential direction of the tire on the tread 1, and in its turn on the treading surface 2.

The circumferential main grooves 3 through 6 have the widths of 8 mm, 12 mm, 6 mm and 12 mm, respectively. The edge of the circumferential main groove 3 located on the left side in FIG. 1 is spaced from the inner edge of the treading portion by 21 mm, and the edge of the circumferential main groove 6 located on the right side is spaced from the inner edge of the treading surface by 52 mm.

A plurality of transverse main grooves 21 are extended in an annular land portion, which is defined by the circumferential main groove, from the edge of the tread to the circumferential main groove 3 such that the transverse grooves are downwardly inclined in a widthwise inner direction of the tread 1 while spaced from adjacent ones in the tire circumferential direction by a specific distance. Thereby, a row 22 of blocks are formed in the annular land portion. Each of the transverse main grooves 21 has the width of 7 mm, and is slightly curved upwardly in a swelled fashion. The width and the curved degree of the groove may be selected depending upon necessity.

In the illustrated embodiment, each of the transverse main grooves 21 extends to the circumferential main groove 5 so that block rows 23 and 24 are defined between the circumferential main grooves 3 and 4 and between the circumferential main grooves 4 and 5, respectively. Those portions of the transverse main grooves which extend between the circumferential main grooves 3 and 4 have widths of 3.5 mm and 6.5 mm alternatively in the tire circumferential direction. Those portions of the transverse main grooves which extend between the circumferential main grooves 4 and 5 alternatively have the widths of 7 mm and 3 mm.

On the other hand, a plurality of bent transverse main grooves 25 are provided in an annular land portion defined by the circumferential main groove 6, while spaced from adjacent ones in the tire circumferential direction by a specific distance. Each of the bent transverse main grooves 25 is bent in an inverse V-letter shape on the way of the land portion. Thereby, that portion of each of the bent transverse main grooves 25 which extends from a bent point K on the widthwise inner side of the tread is inclined in a tire-circumferentially reverse direction to that of the above-mentioned transverse main grooves 21, and that portion of the bent transverse main groove 25 which extends from the bent point K on the widthwise outer side is inclined in the same direction of the transverse main groove 21.

The distance L from the edge of the circumferential main groove 6 to the bent point K of the transverse main groove 25 is preferably 20–110%, more preferably 30–95%, of the distance $l_2$ from the edge of the circumferential main groove 6 to the outer edge of the treading surface. For example, in the tire of FIG. 1, $L/l_2 \times 100 = 90\%$, while in the tire of FIG. 2, $L/l_2 100 = 36\%$.

The angle of the V-letter shaped transverse main groove at the K point is preferably from 110°–160°. If the angle is less than 110°, circumferentially projecting portions near the K points of the land portions adjacent the V-letter shaped transverse main grooves are unlikely to be worn due to low rigidity. Thus, irregular wearing occurs. On the other hand, if the angle is more than 160°, the effects obtained by forming the transverse main grooves in the V-letter shaped form cannot be exhibited.

A row 26 of blocks are defined by these bent transverse main grooves 25 in the annular land portion, which is defined by the circumferential groove 6. Further, in this embodiment, that portion of each of the transverse main grooves 25 which extends widthwise inside the bent point K is extended to the circumferential main groove 5, and opened thereto at a location opposed to the transverse main groove 21. Thereby, a row 27 of blocks are formed in an annular land portion between the circumferential main grooves 5 and 6. The width of that portion of one type of the transverse main grooves 25 which are located widthwise inside the bent point K is 6 mm between the bent point K and the circumferential main groove 6 and 3 mm between the circumferential main grooves 5 and 6. The width of that portion of each of the other type of the transverse main grooves 25 adjacent to one type of the grooves as viewed in the tire circumferential direction is 3 mm between the bent point K and the circumferential main groove 6 and 7 mm between the circumferential main grooves 5 and 6.

According to the invention a pair of the tires having the above-mentioned tread steered pattern, great frictional forces are produced particularly by each of the blocks 26a of the block row 26 of the tire positioned on the outer side in the steered direction at large cornering angles. When forces which must be borne by the blocks exceed the tire frictional force, the blocks 26a transversely slip. However, since each block 26a has the bent portion, the edge portions of the bent portions act on road to produce slip resisting forces. Therefore, rapid drops in the cornering forces due to increase in the cornering angles can extremely effectively be prevented.

Further, the outer portion of each of the transverse main grooves 25 which extends from the bent point K on the widthwise outer side not only effectively contributes to improvement of water drainability of the tire, but also functions during cornering as if it were a straight groove. Therefore, the water drainability can greatly be improved particularly at large cornering angles, and the gripping performance on wet roads can greatly be improved.

Figure 2:
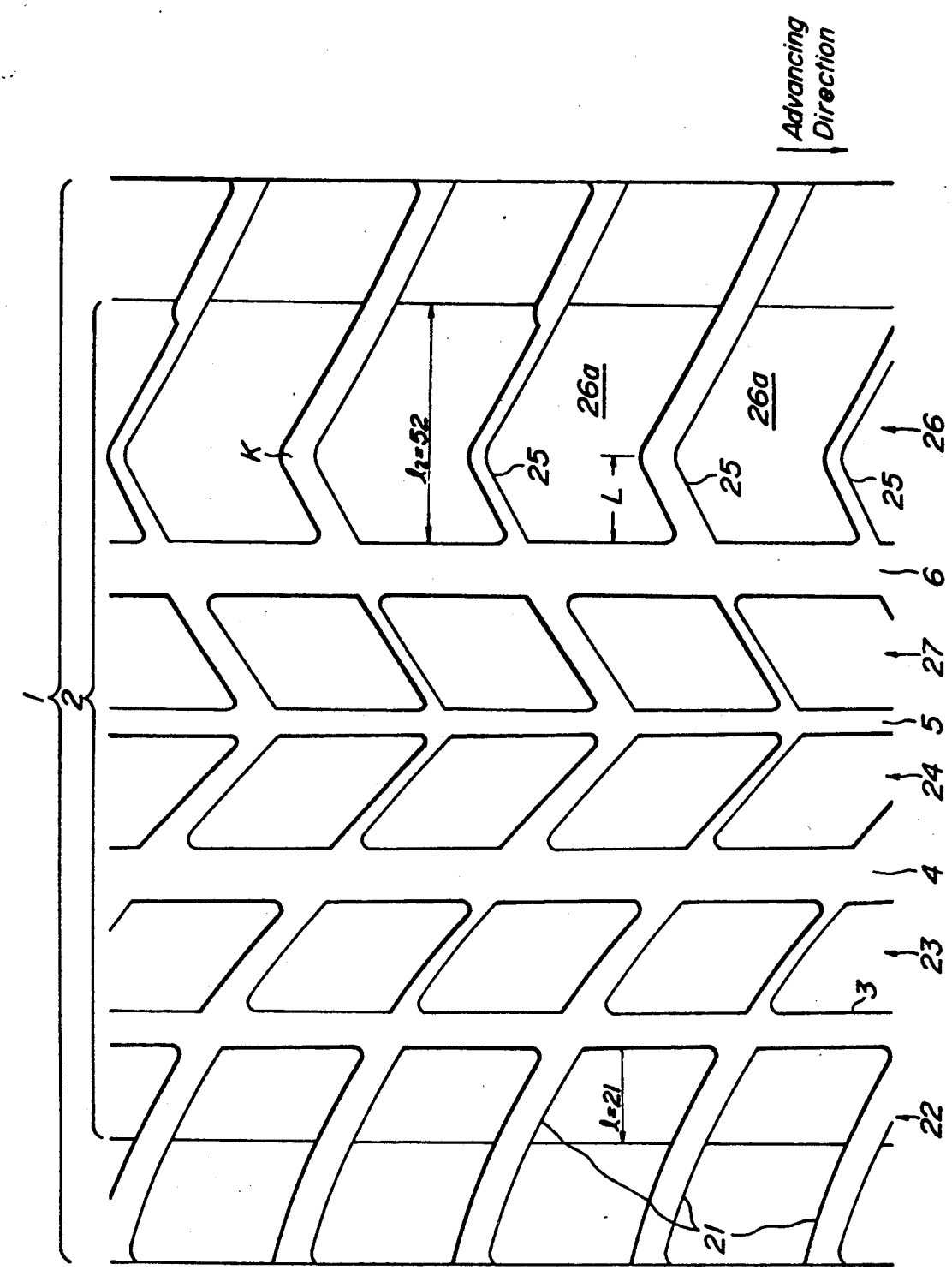

An embodiment shown in FIG. 2 is the same as that shown in FIG. 1 except that the bent points K of the transverse main grooves 25 are positioned closer to the circumferential main groove 6.

Figure 3:
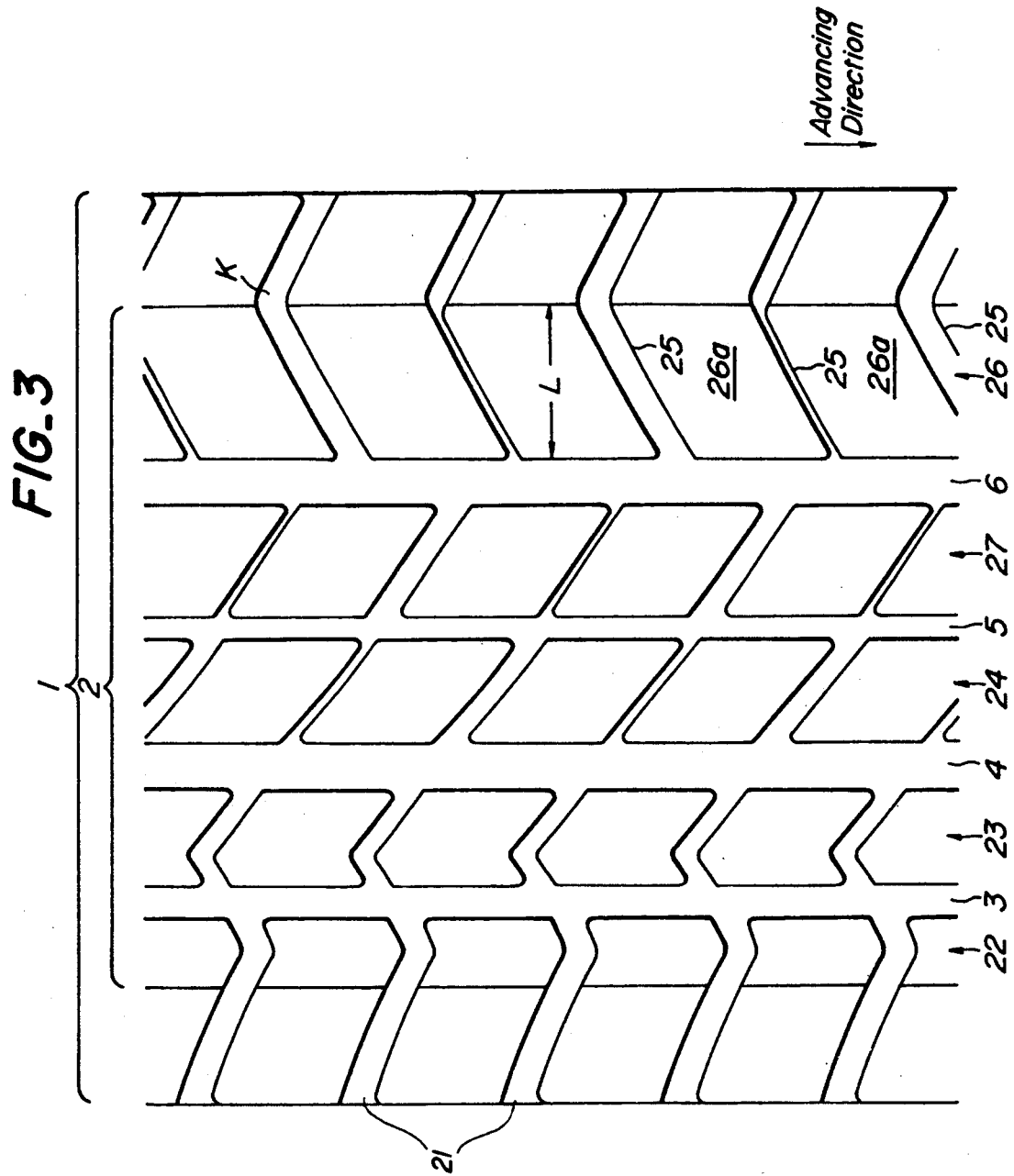

FIG. 3 shows another embodiment according to the present invention, wherein transverse main grooves 25 extend only between a circumferential main groove 6 and an edge of the tread. Bent points K are located on a side edge of a treading surface. Those portions of other transverse main grooves 21 which cross circumferential main grooves 3 are inclined in a direction tire-circumferentially reverse to that of the remaining portions of the groove. Grooves 21 are extended to a circumferential main groove 6.

In this embodiment, the gripping performance on dry roads and wet roads at large cornering angles can also greatly be improved by the action of the blocks 26a defined by the bent transverse main grooves 25.

In the following, an explanation will be made of comparison tests for feeling in handling at large cornering angles with respect to invention tires and a conventional tire.

Figure 4:
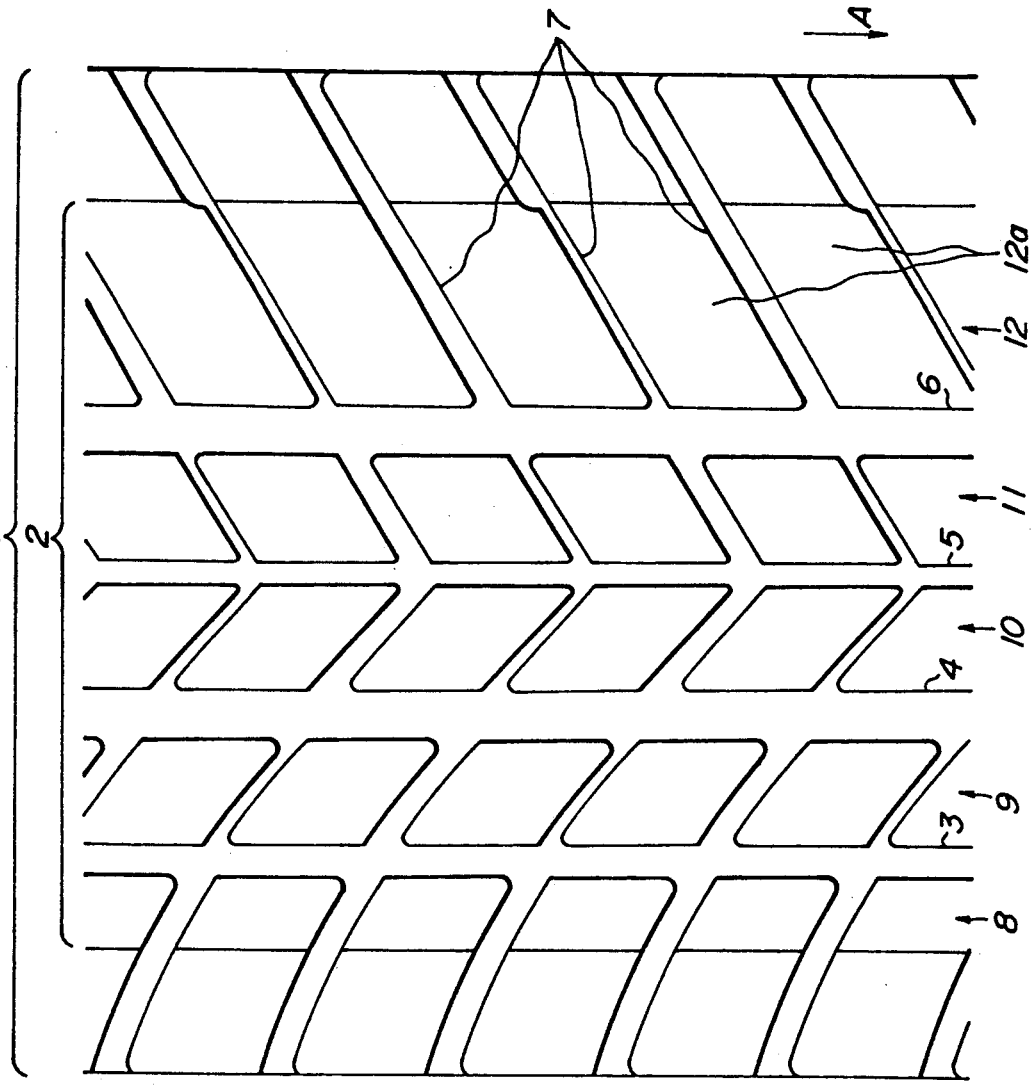
FIG. 4 is the tread pattern in the conventional tire.
Figure 5:
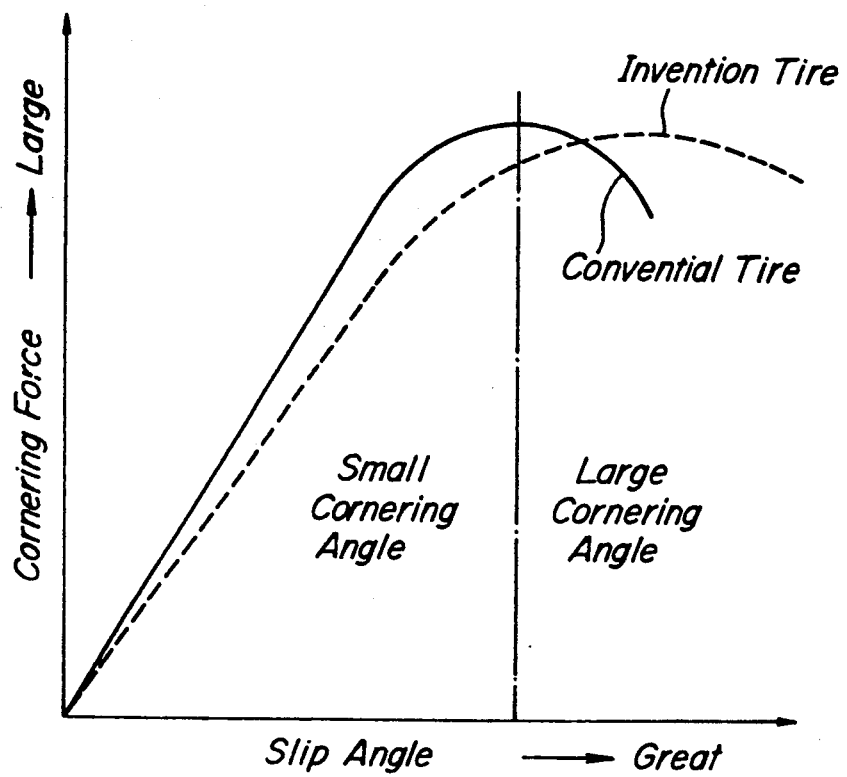
FIG. 5 is a graph showing the relationship between the slip angles and the cornering forces.

Test tire
  Size: 205/55 VR 16
  Invention tire I: Tire having the tread pattern shown in FIG. 1
  Invention tire II: Tire having the tread pattern shown in FIG. 2
  Conventional tire: Tire having the tread pattern shown in FIG. 4

Test method

On dry road, each tire was run on a test course by a trained test driver, and steering maneuver at small angles and in critical situation and, under steering-over steering characteristic as vehicle behaviors were qualitatively evaluated at that time.

On wet roads, a qualitative evaluation was effected in the same manner as in dry road testing in the test course onto which water was sprayed.

Test results

A handling feeling was shown by index with reference to each of the tires by taking the index of the conventional tire as 100.

The greater the index value, the more excellent the results.

TABLE

|  | Conventional tire | Invention tire I | Invention tire II |
|---|---|---|---|
| Feeling in handling on dry road at large cornering forces | 100 | 115 | 110 |
| Feeling in handling on wet road at large cornering forces | 100 | 108 | 110 |

From this table, it is seen that each of the invention tires has far more excellent dry and wet gripping performances as compared with the conventional tire. Among them, Invention tire I has particularly excellent handling feeling.

As mentioned above, according to a pair of the radial tires in the present invention, as compared with the conventional tire, the gripping performance on dry and wet roads can greatly be improved by forming a row of the blocks bent in the V-letter shape in the outer shoulder portion of the tire.

What is claimed is:

1. A pair of radial tire consisting of two steered tires, each of the tires comprising an asymmetrical tread pattern having a directional property when mounted on a vehicle, said two steered tires when mounted on a vehicle having tread patterns symmetrical with respect to a longitudinal centerline of the vehicle, each of said tires having a tread pattern comprising annular land portions formed by a plurality of circumferential main grooves extending in a circumferential direction of the tire, and rows of blocks formed by extending transverse main grooves inclined in the circumferential direction in at least land portions of the tire, each of the transverse main grooves defining rows of the blocks to be located axially inside of said tire when mounted is extended and inclines downwardly in the width direction as viewed from the front side of the tire when mounted on a vehicle, each of the transverse main grooves of the tire defining the row of blocks located on an axially outer side extends from a tread edge in a substantially inverse V-shape in a range of 110° to 160° as viewed from the front side of the tire when mounted on a vehicle and, wherein a bent point forming an inflection point of said inverse V-shape is located on said axially outermost row of blocks, and wherein the distance from an edge of the outermost circumferential main groove to the bent point of each of the transverse main grooves is 30–95% of the distance from the edge of the outermost circumferential main groove to the outer edge of the treading portion;

wherein each of said transverse main grooves extending on an axially inner side of said tire when mounted on the vehicle has an inflection point in the innermost row of blocks located on the axially inner side of said tire when mounted on the vehicle, and each of said transverse main grooves extending on an axially innerside of said tire when mounted on the vehicle has a second inflection point in a row of blocks located adjacent to said axially innermost row.

2. A pair of radial tires consisting of two steered tires, each of the tires comprising an asymmetrical tread pattern having a directional property when mounted on a vehicle, said two steered tires when mounted on a vehicle having tread patterns symmetrical with respect to a longitudinal centerline of the vehicle, each of said tires having a tread pattern comprising annular land portions formed by a plurality of circumferential main grooves extending in a circumferential direction of the tire, and rows of blocks formed by extending transverse main grooves inclined in the circumferential direction in at least land portions of the tire, each of the transverse main grooves defining rows of the blocks to be located axially inside of said tire when mounted is extended and inclines downwardly in the width direction as viewed from the front side of the tire when mounted on a vehicle, each of the transverse main grooves of the tire defining the row of blocks located on an axially outer side extends from a tread edge in a substantially inverse V-shape in a range of 110° to 160° as viewed from the front side of the tire when mounted on a vehicle and, wherein a bent point forming an inflection point of said inverse V-shape is located on said axially outermost row of blocks, and wherein the distance from an edge of the outermost circumferential main groove to the bent point of each of the transverse main grooves is 30–95% of the distance from the edge of the outermost circumferential main groove to the outer edge of the treading portion;

said transverse main grooves having different widths, and each transverse main grooves has groove portions defined by said circumferential main grooves and wherein said groove portions have different widths.

3. A pair of radial tires consisting of two steered tires, each of the tires comprising an asymmetrical tread patterns having a directional property when mounted on a vehicle, said two steered tires when mounted on a vehicle having tread patterns symmetrical with respect to a longitudinal centerline of the vehicle, each of said tires having a tread pattern comprising annular land portions formed by a plurality of circumferential main grooves extending in a circumferential direction of the tire, and rows of blocks formed by extending transverse main grooves inclined in the circumferential direction in at least land portions of the tire, each of the transverse main grooves defining rows of the blocks to be located axially inside of said tire when mounted is extended and inclines downwardly in the width direction as viewed from the front side of the tire when mounted on a vehicle, each of the transverse main grooves of the tire defining the row of blocks located on an axially outer side extends from a tread edge in a substantially inverse V-shape in a range of 110° to 160° as viewed from the front side of the tire when mounted on a vehicle and, wherein a bent point forming an inflection point of said inverse V-shape is located on said axially outermost row of blocks, and wherein the distance from an edge of the outermost circumferential main groove to the bent point of each of the transverse main grooves is 30–95% of the distance from the edge of the outermost circumferential main groove to the outer edge of the treading portion;

wherein said transverse main grooves have different widths, and each transverse main grooves has groove portions defined by said circumferential main grooves and wherein adjacent groove portions of adjacent transverse main grooves have different widths.

* * * * *